(12) United States Patent
Mongia

(10) Patent No.: US 8,208,250 B2
(45) Date of Patent: Jun. 26, 2012

(54) EXTERNAL THERMAL SOLUTION FOR A MOBILE COMPUTING DEVICE

(75) Inventor: Rajiv K. Mongia, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 186 days.

(21) Appl. No.: 12/384,726

(22) Filed: Apr. 8, 2009

(65) Prior Publication Data

US 2010/0259886 A1 Oct. 14, 2010

(51) Int. Cl.
*H05K 7/20* (2006.01)
*H05K 5/00* (2006.01)
*A47B 77/08* (2006.01)
*F28F 7/00* (2006.01)
*H01L 23/34* (2006.01)

(52) U.S. Cl. .......... 361/679.47; 361/695; 361/696; 361/701; 361/703; 361/679.49; 454/184; 312/236; 165/80.2; 257/721; 174/16.1

(58) Field of Classification Search ............ 361/695, 361/696, 697, 701, 703, 679.47, 679.48, 361/679.49, 679.51; 454/184; 312/236; 174/16.1; 165/80.2; 257/721–722
See application file for complete search history.

(56) References Cited

U.S. PATENT DOCUMENTS

| | | | | |
|---|---|---|---|---|
| 5,566,377 A * | 10/1996 | Lee | | 361/695 |
| 5,898,569 A * | 4/1999 | Bhatia | | 361/700 |
| 5,959,836 A * | 9/1999 | Bhatia | | 361/679.41 |
| 6,151,211 A * | 11/2000 | Dayan et al. | | 361/690 |
| 6,563,703 B2 * | 5/2003 | Xie | | 361/679.33 |
| 6,963,488 B1 * | 11/2005 | Chen | | 361/679.49 |
| 7,164,580 B2 | 1/2007 | DiStefano | | |
| 2011/0176273 A1 * | 7/2011 | Olsen et al. | | 361/679.47 |

* cited by examiner

*Primary Examiner* — Zachary M Pape
(74) *Attorney, Agent, or Firm* — Derek J. Reynolds

(57) ABSTRACT

A method, system, and apparatus are disclosed. In one embodiment method includes causing a cooling medium to flow through a hollow cable. The cable couples an external cooling station to a heat exchanging unit. The heat exchanging unit is located within a mobile computing device. The method then transfers heat from within the mobile computing device to the cooling medium at the heat exchanging unit. Then the cooling medium contained the transferred heat is expelled out of the mobile computing device.

11 Claims, 7 Drawing Sheets

EXTERNAL THERMAL SOLUTION FOR A MOBILE COMPUTING DEVICE

FIELD OF THE INVENTION

The invention relates to external thermal solutions for a mobile computing device.

BACKGROUND OF THE INVENTION

Mobile computing devices such as laptop computers, handheld computing devices, smart cell phones, and mobile game consoles, among others, have become ubiquitous. The capabilities of many of these devices requires significant processor performance within the device (e.g. a general purpose central processing unit (CPU), a graphics processing unit (GPU), a combination of both a CPU and GPU, etc.). These components tend to generate significant heat. Thermal solutions that are capable of cooling a component generating significant heat can be bulky depending on how robust a solution is required (i.e. heatsinks, fans, liquid cooling solutions, etc.). Many mobile computing devices have small form factors where space for a large thermal solution is not available.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
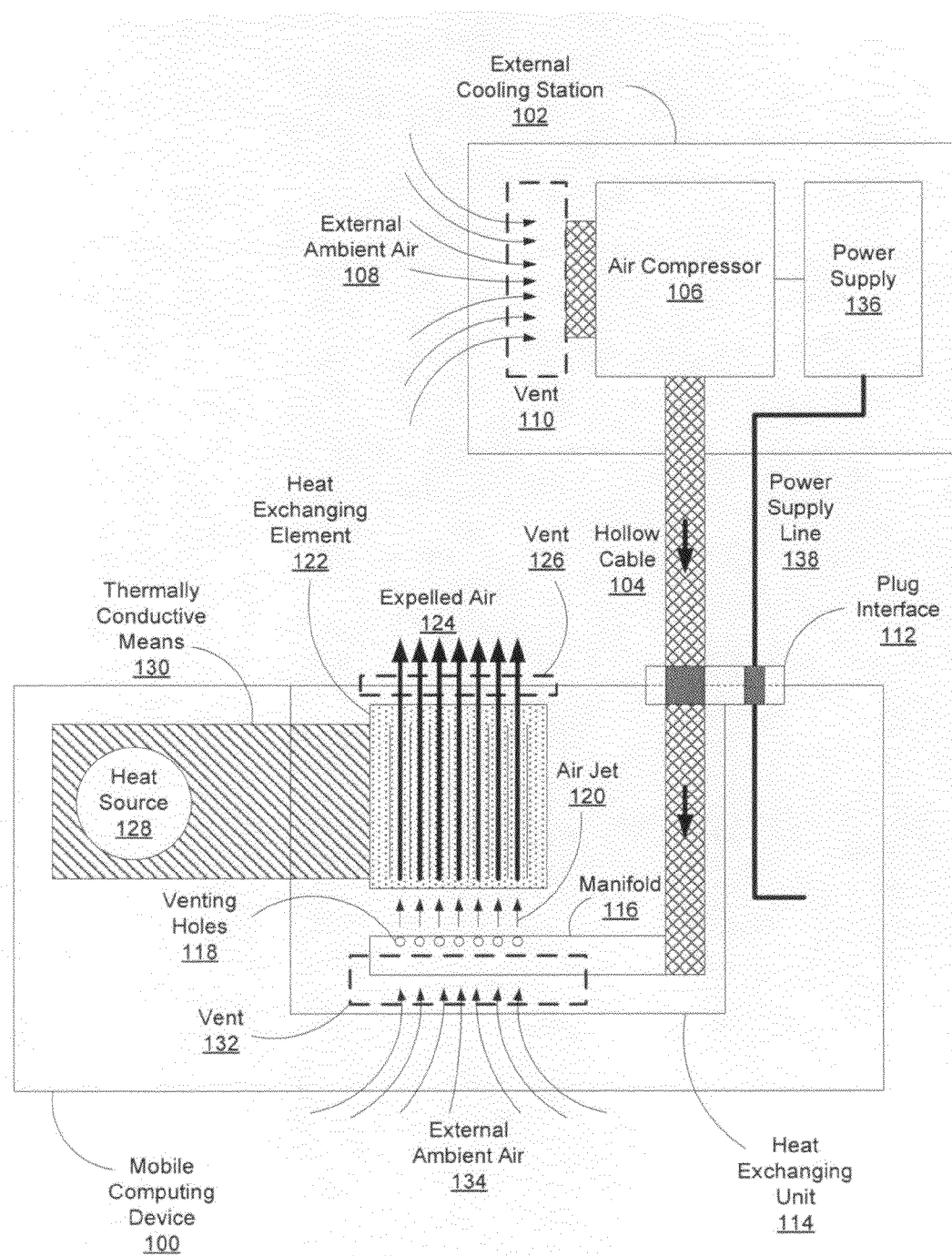
FIG. 1 illustrates a forced air cooling medium embodiment a system and apparatus to enhance thermal dissipation in a mobile computing device using a hollow cable to couple the mobile computing device to an external cooling station.

Embodiments of a method, system, and apparatus to enhance thermal dissipation in a mobile computing device using a hollow cable to couple the mobile computing device to an external cooling station are disclosed.

Mobile computing devices have gone through many advances over the years. Among these advances is the smaller and smaller size of the devices. As mobile computing devices shrink in size, the components within each device must also shrink. A high performance central processing unit (CPU) in a mobile computing device may generate substantial heat. A graphics processing unit (GPU) within the mobile computing device may also generate substantial heat if it is a discrete chip from the CPU, though many times the GPU is integrated into the CPU. The CPU and/or GPU therefore may require a substantial thermal solution to keep the component(s) within an operable temperature range.

The capability of a thermal solution to dissipate heat is somewhat a factor of the solution's size. In other words, larger heatsinks and larger fans tend to dissipate heat at a faster rate than their smaller counterparts. Thus, there is essentially a conflict of interest between the desire to have higher performing and smaller mobile computing devices and the potentially significant thermal solution size requirement.

Many mobile computing devices have advanced power management features, such as Advanced Configuration and Power Interface (ACPI) capabilities. Using features such as these, a mobile computing device may adjust the performance of the processor (e.g. the working frequency), change the brightness of the display, and change other device parameters when moving into different environments. For example, a CPU in a mobile computing device may have a certain operating frequency when the mobile computing device is plugged in to an AC power source and the operating frequency may be cut in half when the device is not plugged in and instead running on DC battery power.

One such operating modification may include running the mobile computing device at different performance levels based on the available thermal solution. For example, a laptop computer docking station may have an enhanced thermal solution for the laptop when the laptop is docked. This can include extra fans located in the docking station that may blow external ambient air through a vent into the bottom of the laptop to increase the airflow across a heatsink attached to the CPU chip. Thus, when the laptop is docked in the station, the CPU in the laptop computer may run at a first frequency. When the user undocks the laptop computer, the CPU frequency may decrease due to the loss of the docking station enhanced thermal solution.

Docking stations may help allow mobile computing devices to have increased performance due to the potential thermal solution enhancements, but that is currently generally limited to large, fixed location docking stations with fans and potentially other thermal solutions that can be directly coupled to the mobile computing device while docked. On top of the enhanced thermal solution, the docking station may also provide AC power, a network connection such as an Ethernet connection, as well as many other connections like a Universal Serial Bus (USB) connection and an external display connection.

Apart from fixed location docking stations that a user couples to the entire mobile computing device, other types of docking stations exist that requires connecting only a single cable to the mobile computing device. This type of solution generally has the same AC power connection, Ethernet, USB, display, and other connections, but currently would not include an enhanced thermal solution.

Thus, in many embodiments, a single cable-based docking solution includes one or more hollow channels within the cable. An external cooling station, which is coupled to one end of the hollow cable, sends a cooling medium through the cable to the mobile computing device. In different embodiments, the cooling medium may comprise air or liquid. The mobile computing device, which is coupled to the other end of the hollow cable, receives the cooling medium in a heat exchanging unit located within the mobile computing device. The heat exchanging unit allows the cooling medium to interact with a heat exchanging element (e.g. a heatsink). At least some of the heat radiating from the heat exchanging element will transfer into the cooling medium during the interaction. Then the cooling medium containing this transferred heat is transferred out (i.e. expelled) from the heat exchanging unit and the mobile computing device in general. This expelling process of the cooling medium containing the transferred heat helps to maintain acceptable thermal dissipation levels of the CPU (or any other heat source component) that would otherwise not be maintainable with the onboard thermal solution in the mobile computing device.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

FIG. 1 illustrates a forced air cooling medium embodiment of a system and apparatus to enhance thermal dissipation in a mobile computing device using a hollow cable to couple the mobile computing device to an external cooling station.

Mobile computing device 100 is coupled to external cooling station 102 through hollow cable 104. In many embodiments, the hollow cable 104 is a flexible cable. An air compressor 106 is located within external cooling station 102 to compress external ambient air 108 that enters the external cooling station 102 through vent 110. The size and strength of the air compressor 106 varies in different embodiments. A larger compressor allows a stronger compressed airflow through hollow cable 104 but consumes more power and potentially operates at a higher noise decibel level. A smaller compress is limited to a relatively weaker compressed airflow through hollow cable 104 but beneficially consumes less power and may be quieter. Thus, the noise restrictions and form factor restrictions of the size of the external cooling station may help determine the size of air compressor 106.

When the compressed (i.e. forced) air in the hollow cable 104 reaches the mobile computing device 100, it travels into the device through a plug interface 112. In different embodiments, the plug interface 112 can take different forms. The key to the plug interface is that it allows for a sealed connection of the hollow cable 104 with the mobile computing device 100 so no forced air can leak out and lower the compression and effectiveness of the airflow.

The forced air enters the mobile computing device 100 at a heat exchanging unit 114. In many embodiments, the forced air continues within the heat exchanging unit within an internal hollow cable until it reaches a manifold 116. In different embodiments, the manifold 116 is the shape of a pipe, tube, or another form that allows the forced air to pass through. In some embodiments, the internal diameter of the manifold 116 may be substantially the same size as the internal diameter of the hollow cable 104. In other embodiments, the internal diameter of the manifold 116 may be smaller than the internal diameter of the hollow cable 104. One end of the manifold 116 is coupled to the internal hollow cable and the other end is sealed. In many embodiments, the manifold 116 contains several venting holes 118 in one side that are in a line. Each of the venting holes 118 is substantially smaller in diameter than the internal diameter of the manifold 116. For example, if the internal diameter of the manifold is 0.5 centimeters (cm), then the diameter of each venting hole may be 0.05 cm or smaller.

Thus, when the forced air arrives at the venting holes 118, it is expelled out at an increased velocity due to the size difference of the venting holes 118. Essentially, each venting hole expels a small air jet 120. The location of the set of venting holes 118 therefore causes a plane of jetted air to flow in the direction the holes face. In many embodiments, the manifold 116 is situated at one end of a heat exchanging element 122 within the heat exchanging unit 114. In many embodiments, the heat exchanging element is a heatsink. The heatsink may be designed in many different configurations. In many embodiments, the heatsink is made of a thermally conductive metal, such as aluminum or copper. In many embodiments, several fins protrude out of the top portion of the heat exchanging element 122 to increase the dissipation of heat. Thus, the manifold 116 may be positioned so that the forced air from the air jets 120 flows through several channels in the heat exchanging element 124 between each of the fins. As the forced air passes through these channels, a portion of the heat radiating from the heatsink is transferred into the air. The heated forced air is then expelled out of the heat exchanging unit 114 (expelled air 124) and the mobile computing device 100 in general through vent 126.

In some embodiments, a heat source (e.g. a CPU chip) is located directly under, and in direct contact with the heat exchanging element 122. Although, due to the form factor and layout restrictions in many mobile computing devices, the heat exchanging unit 114 and heat exchanging element 122 may not be able to be located directly above the heat source. In these alternate heat source location embodiments, a heat source 128 may be located elsewhere in the mobile computing device 100. The heat source 128 can then be in direct contact with a thermally conductive means 130. In different embodiments, the thermally conductive means 222 may be a thermally conductive plate, heat pipe, or other effective means of transferring heat from one location to another. The means may be made out of the same thermally conductive material as the heat exchanging element 122 or made out of a different thermally conductive material. The thermally conductive means 130 runs from the heat source 128 to the heat exchanging element 122 in the heat exchanging unit 114. The thermally conductive means 130 would be in direct contact with the heat exchanging element 122. Thus, the heat generated from the heat source 128 can transfer to the thermally conductive means 130 and then transfer from the means to the heat exchanging element 122 for interaction with the forced air. Additionally, the thermally conductive means 130 may be coupled to a single heat exchanging element or to multiple separate heat exchanging elements.

In cases where the air compressor 106 and hollow cable 104 cannot provide a great deal of compression (and therefore a low airflow may exit through the air jets 120), a secondary air source may be included to increase the flow and provide for a greater amount heat transfer into the air. In many embodiments, vent 132 is located in close proximity to manifold 116 and provides an intake through which air can flow. The flow of the air jets 120 in the direction across the heat exchanging element 122 creates a negative pressure zone at vent 132, which causes external ambient air 134 to be entrained into the heat exchanging unit and combined with the air flow from the air jets 120 to create a greater flow across the heat exchanging element 122 than the forced air from the manifold 116 can provide alone. For example, while the forced air alone being expelled from manifold 116 in air jets 120 may total 0.05 cubic feet per minute (cfm), when combined with the entrained external ambient air 134, the air flow across the heat exchanging element 122 may increase to 0.5 cfm.

In many embodiments, the external cooling station 102 may be a portion of a block power supply for the mobile computing device 100. For example, the block may include the power supply circuitry 136 in addition to the air compressor 106. Thus, in these embodiments, the hollow cable 102 coupled to the external cooling station 102 may also include a power supply line 138 to supply power to the mobile computing device 100. In other embodiments that are not shown, in addition to the hollow cable 104 containing the forced airflow and the power supply line 138, other data transmission lines such as an Ethernet cable, a USB cable, and a display cable may also be incorporated into a single cable coupling the external cooling station 102 to the mobile computing device 100. Additionally, power supply circuitry 136 may also power the air compressor 106.

Figure 2:
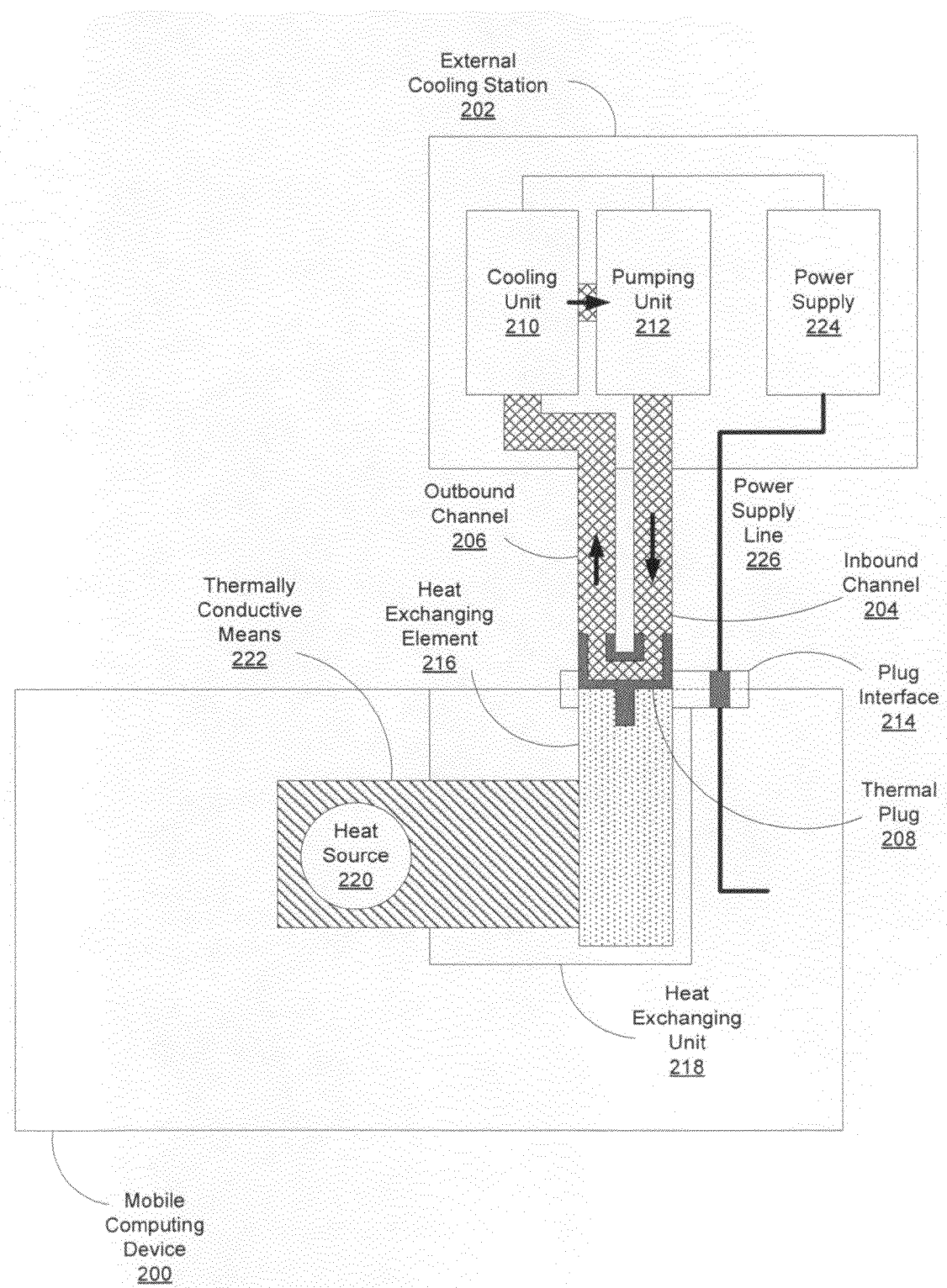
FIG. 2 illustrates a liquid cooling medium embodiment a system and apparatus to enhance thermal dissipation in a mobile computing device using a hollow cable to couple the mobile computing device to an external cooling station.

FIG. 2 illustrates a liquid cooling medium embodiment a system and apparatus to enhance thermal dissipation in a mobile computing device using a hollow cable to couple the mobile computing device to an external cooling station.

Mobile computing device 200 is coupled to external cooling station 202 through a dual-channeled cable that includes inbound channel 204 and outbound channel 206. In many embodiments, the dual-channeled cable 204 is a flexible cable. The dual-channeled cable and additional portions of channels that are routed within the external cooling station 202 and a thermal plug 208 comprise a sealed loop for a liquid cooling medium to flow through. In many embodiments, the liquid cooling medium may be substantially comprised of water (H2O). In other embodiments, the liquid cooling medium may be substantially comprised of some other liquid, such as ethylene glycol or another form of a dielectric fluid. Inbound channel 204 is referred to as the "inbound" channel because the flow of the cooling medium is inbound to the device to be cooled and the outbound channel 206 is referred to as the "outbound" channel because the flow of the cooling medium is outbound from the device to be cooled to a location external to the device.

The liquid medium is cooled in the cooling unit 210. The cooling unit 210 may use some form of fan, heatsink, refrigeration process, or other method of cooling the liquid medium. From the cooling unit 210, the liquid medium flows through a channel to the pumping unit 212. The pumping unit 212 provides the forceful pumping action to keep the liquid medium in a constant flow through the loop. Once the cooled liquid medium is pumped out of the external cooling station 202, it flows within the inbound channel of the cable to the thermal plug 208.

The cooled liquid medium then passes through a channel within the thermal plug 208 and then returns to the external cooling station 202 through the outbound channel 206 also coupled to the thermal plug 208 and the loop is complete. The thermal plug is a portion of the cable side of plug interface 214.

When the thermal plug 208 is plugged into the mobile computing device 200 side of the plug interface 214, the thermal plug is inserted into a receptacle within a heat exchanging element 216 in a heat exchanging unit 218 at one edge of the mobile computing device 200. The heat exchanging element 216 and the thermal plug are both comprised of thermally conductive materials. For example, they may be constructed of metals such as copper (Cu), aluminum (Al), or another metal, metal alloy, or other thermally conductive material such as graphite.

In many embodiments, the heat exchanging element is heated by a heat source internal to the mobile computing device 200 (e.g. an operational CPU chip). Thus, when the thermal plug 208 is plugged into the receptacle in the heat exchanging element 216, a portion of the heat radiating from the heat exchanging element 216 will transfer to the thermal plug. Furthermore, when the cooled liquid medium passes through the channel internally within the plug there is an additional heat transfer from the thermal plug 208 to the liquid medium. The heated liquid medium flows back to the cooling unit 210 within the external cooling station 202 through outbound channel 206 to be cooled again and the liquid loop is complete. Because the liquid medium is limited to entering and exiting the sealed channel through the thermal plug 208, there is no liquid transfer into the mobile computing device.

In some embodiments, a heat source (e.g. a CPU chip) is located directly under, and in direct contact with the heat exchanging element 216. Although, due to the form factor and layout restrictions in many mobile computing devices, the heat exchanging unit 214 and heat exchanging element 216 may not be able to be located directly above the heat source. In these alternate heat source location embodiments, a heat source 220 may be located elsewhere in the mobile computing device 200. The heat source 220 can then be in direct contact with a thermally conductive means 222. In different embodiments, the thermally conductive means 222 may be a thermally conductive plate, heat pipe, or other effective means of transferring heat from one location to another. The means may be made out of the same thermally conductive material as the heat exchanging element 216 or made out of a different thermally conductive material. The thermally conductive means 222 runs from the heat source 220 to the heat exchanging element 216 in the heat exchanging unit 214. The thermally conductive means 222 would be in direct contact with the heat exchanging element 216. Thus, the heat generated from the heat source 220 can transfer to the thermally conductive means 222 and then transfer from the means to the heat exchanging element 216 for interaction with the thermal plug 208. In many embodiments, the heat exchanging element 216 and the thermally conductive means 222 are fabricated as a single thermally conductive component that transfers heat directly from the heat source 220 to the thermal plug 208. Additionally, the thermally conductive means 130 may be coupled to a single heat exchanging element or to multiple separate heat exchanging elements.

Again, in many embodiments, the external cooling station 202 may be a portion of a block power supply for the mobile computing device 200. For example, the block may include the power supply circuitry 224 in addition to the cooling unit 208 and the pumping unit 210. Thus, in these embodiments, the dual-channeled cable coupled to the external cooling station 202 may also include a power supply line 226 to supply power to the mobile computing device 200. In other embodiments that are not shown, in addition to the dual-channeled cable containing the inbound and outbound liquid medium flows and the power supply line 226, other data transmission lines such as an Ethernet cable, a USB cable, and a display cable may also be incorporated into a single cable coupling the external cooling station 202 to the mobile computing device 200.

In some embodiments that are not shown, the cooling unit 210 and the pumping unit 212 may be located in the reverse order in the loop. In other words, the pumping unit 212 may pump the liquid medium through the cooling unit 210 and then to the inbound channel 204.

In other embodiments that are not shown in FIG. 2, the thermal plug may include the female receptacle and the heat exchanging unit within the mobile computing device may include the male slug. In these embodiments the thermal plug and the mobile computing device are still coupled, but the male and female portions of the coupling are in the reversed positions.

Figure 3:
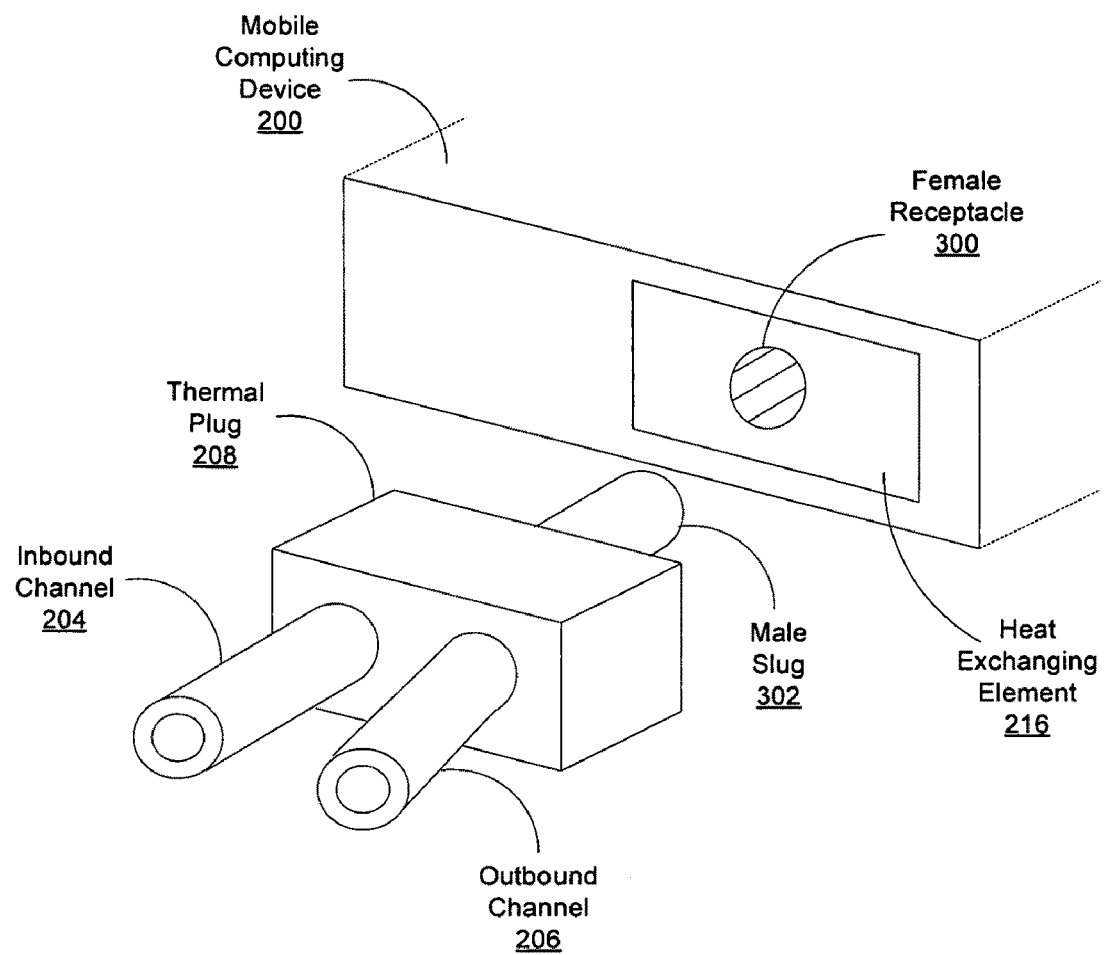
FIG. 3 is an isometric view of one embodiment of the plug interface between the thermal plug and the heat exchanging element.

FIG. 3 is an isometric view of one embodiment of the plug interface between the thermal plug and the heat exchanging element.

Mobile computing device 200 is shown with the heat exchanging element 216 at one edge of the device. The heat exchanging element includes a female receptacle 300. The thermal plug 208 at the end of the dual-channeled cable (including inbound channel 204 and outbound channel 206) includes a male slug 302. The male slug 302 is a portion of the thermal plug 208. In different embodiments, the male slug 302 may be made out of the same thermally conductive material as the thermal plug 208 or a different thermally conductive material. The male slug 302 can take one of many forms, such as a cylinder with a flat end, a cylinder with a conical end, a cone, etc. The cavity of the female receptacle 300 would be the same shape as the male slug 300 to create maximum contact between the surfaces of the slug and receptacle when the slug is inserted into the receptacle.

Additionally, the rest of the thermal plug 208, including the box shaped section that has the male slug 302 protruding from it, includes a channel through which the liquid medium entering the plug from the inbound channel 204 travels through and returns out through the outbound channel 206. Furthermore, the flat surface of the box portion of the thermal plug 208 facing the heat exchanging element 216 may come in contact with the flat portion of the heat exchanging element 216 facing the thermal plug 208, which creates more extensive thermally conductive contact regions between thermal plug 208 and heat exchanging element 216. This would help transfer additional heat from the heat exchanging element 216 to the thermal plug 208.

In many embodiments, the thermal plug 208 includes a spring, magnetic, or mechanical means to hold contact between the plug and the mobile computing device.

Figure 4:
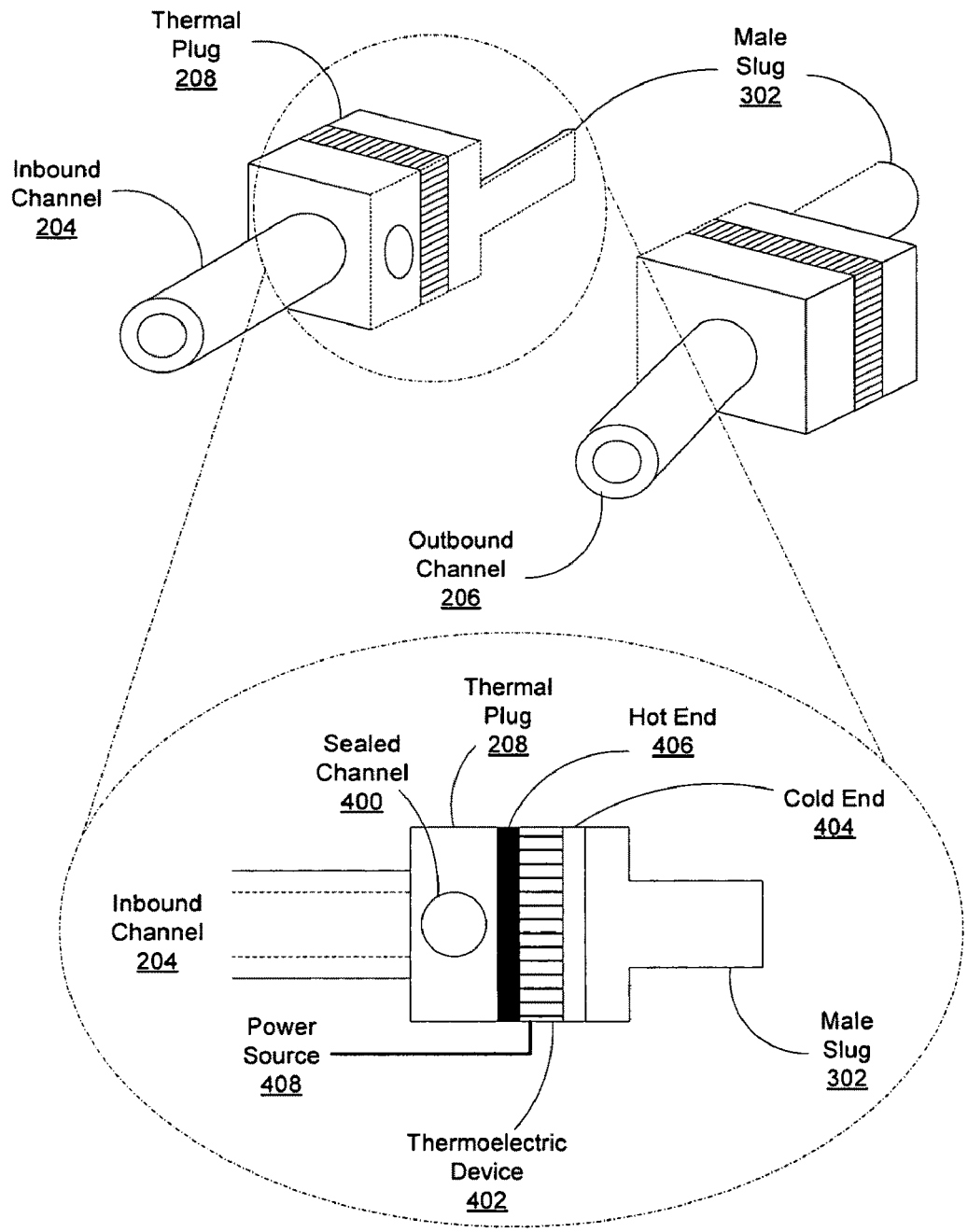
FIG. 4 illustrates an embodiment of the thermal plug that includes an integrated thermoelectric device to provide an additional cooling means.

FIG. 4 illustrates an embodiment of the thermal plug that includes an integrated thermoelectric device to provide an additional cooling means. In FIG. 4, the thermal plug 208 is shown split apart and a larger cross-sectional view of the plug is provided.

The thermal plug 208 includes the plug channel 400 to allow the liquid medium to flow through the plug from the inbound channel 204 to the outbound channel 206. Additionally, a thermoelectric device 402 is integrated into the thermal plug 208.

The thermoelectric device 402 is positioned so that when a power source 408 provides power to the device the cold end 404 of the thermoelectric device 402 is located in close proximity to the slug to cool the thermally conductive material of the slug. The cold end 404 of the thermoelectric device would help to further transfer heat out of the female receptacle (300 in FIG. 3) into the male slug 302. The hot end 406 of the thermoelectric device 402 is located further back in the thermal plug 208 in close proximity to the sealed channel 400 to allow for heat emanating from the hot end 406 of the thermoelectric device 402 to transfer to the liquid medium flowing through the sealed channel 400.

In many embodiments, the cold end 404 of the thermoelectric device 402 may be thermally coupled to the male slug 302 through the thermally conductive material that comprises the thermal plug 208 and the male plug 302. Additionally, in many embodiments, the hot end 406 of the thermoelectric device 402 may be thermally coupled to the thermally conductive material portion of the thermal plug 208 surrounding the sealed channel 400. In other embodiments, several sealed channels are running through the thermally conductive material to distribute the flow of the liquid medium through a portion of the thermal plug 208 more evenly.

Additionally, a power source 408 supplies power to the thermoelectric device 402 to allow the device to operate. The power source may be the power supply (224 in FIG. 2) and the power supply line (226 in FIG. 2) may branch off at the thermal plug 208 to supply power to the thermoelectric device 402 in addition to supplying power to the mobile computing device.

Figure 5:
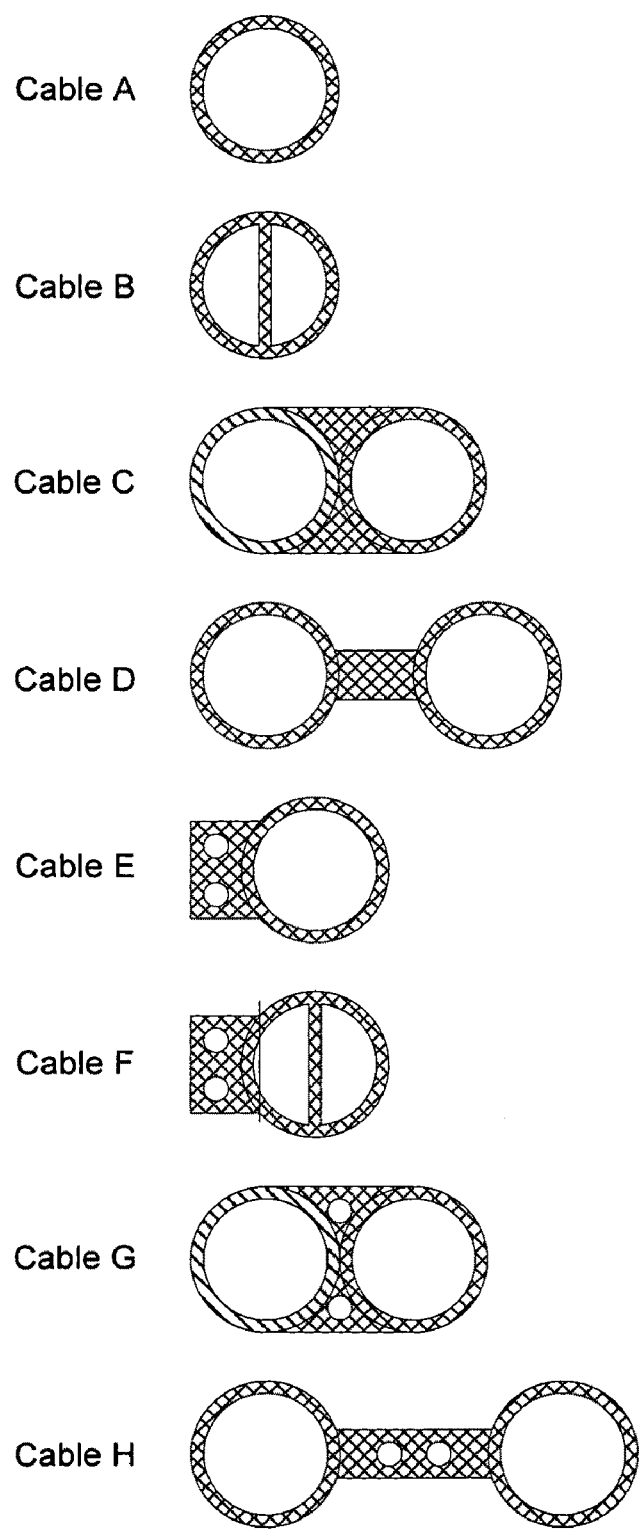
FIG. 5 illustrates a number of examples of cross-sectional views of the cable coupling the external cooling station to the mobile computing device.

FIG. 5 illustrates a number of examples of cross-sectional views of the cable coupling the external cooling station to the mobile computing device.

Cable A illustrates a standard hollow cable cross-section that may provide a forced airflow from the external cooling station to the mobile computing device.

Cable B illustrates a dual-channeled cable that looks just like Cable A externally, but adds a partition between an inbound and outbound channel for a looping liquid medium.

Cable C illustrates a greater liquid medium throughput dual-channeled cable, each channel including.

Cable D illustrates the same liquid medium throughput as Cable C, although the two channels are further separated from each other to limit the amount of heat that may transfer from the liquid medium flowing through the outbound channel to the liquid medium flowing through the inbound channel.

Cables E-H are similar to Cables A-D respectively, with the addition of two more cables. The smaller cables, represented by the smaller circles within the cross sections, may be power lines, or data lines for information transmissions along the cable.

It should be noted that any number of data and power lines could be added in a great deal of cable configurations. Therefore, it should be appreciated that Cables A-H are simply meant to show examples of how the multi-functional cable may be situated.

Figure 6:
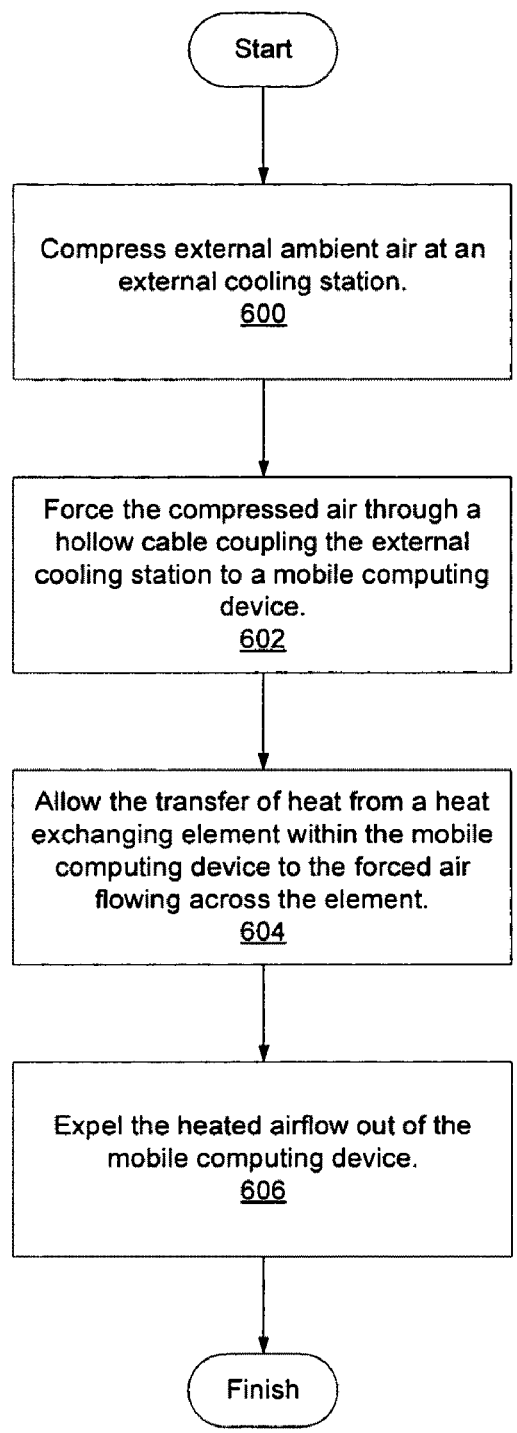
FIG. 6 is a flow diagram of one embodiment of a process to facilitate remote cooling of a mobile computing device through the use of an air medium.

FIG. 6 is a flow diagram of one embodiment of a process to facilitate remote cooling of a mobile computing device through the use of an air medium.

The process begins by compressing external ambient air (block 600). The ambient air may arrive through an air intake to an air compressor. In many embodiments, the air compressor is located within an external cooling station. Next the compressed air is forced to flow through a hollow cable to a mobile computing device (block 602).

Then, heat from within the mobile computing device is transferred into the forced airflow (block 604). The transferring may occur using several small jets of air that flow out of a manifold coupled to the hollow cable. The small jets flow across a heat exchanging element, such as a heatsink, that radiates heat received from a heat source within the mobile computing device. Additionally, in many embodiments discussed above, the small jets of air entrain additional external ambient air received from a vent intake in close proximity to the manifold. The air intake may reside on any given surface of the mobile computing device (e.g. the top of a laptop computer, the bottom of a handheld gaming console, etc.).

Then the air flowing across the heat exchanging element is expelled out of the mobile computing device through another vent (block 606) and the process is finished.

Figure 7:
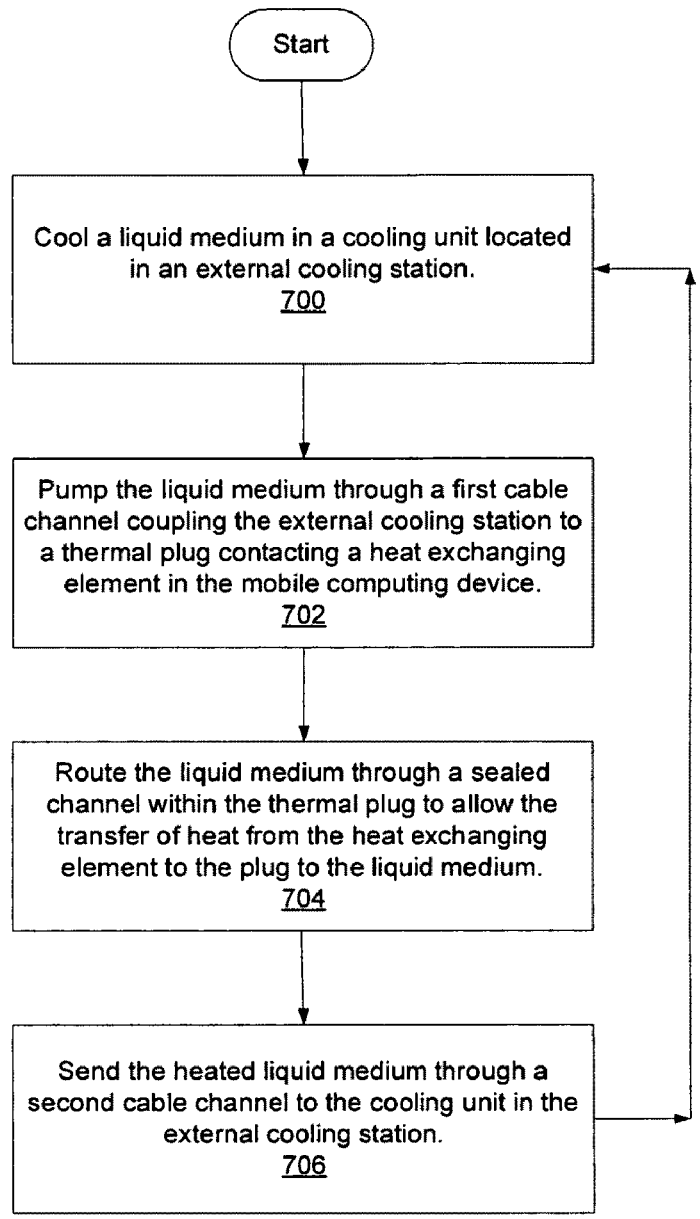
FIG. 7 is a flow diagram of an embodiment of a process to facilitate remote cooling of a mobile computing device through the use of a liquid medium.

FIG. 7 is a flow diagram of an embodiment of a process to facilitate remote cooling of a mobile computing device through the use of a liquid medium.

The process begins by cooling a liquid medium in a cooling unit within an external cooling station (block 700). Then the cooled liquid medium is fed to a pumping unit which pumps the liquid medium through an inbound channel hollow cable to a thermal plug at the end of the inbound channel hollow cable (block 702).

Then, the liquid medium flows through a sealed channel within the thermal plug (block 704) made from a thermally conductive material. The thermal plug is in direct contact with a heat exchanging element through a plug interface at the edge of the mobile computing device. The heat exchanging element may either be in direct contact with a heat source within the mobile computing device or coupled to the heat source through a thermally conductive means or other device. A portion of the heat radiating from the heat exchanging element is then transferred into the thermal plug material, and subsequently transferred into the liquid medium flowing through the sealed channel within the thermal plug.

Next, the heated liquid medium is sent back through an outbound channel hollow cable to the cooling unit within the external cooling station (block 706) and the process repeats.

Thus, embodiments of a method, system, and apparatus to enhance thermal dissipation in a mobile computing device using a hollow cable to couple the mobile computing device to an external cooling station are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   causing forced air to flow through a hollow cable coupling an external cooling station to a heat exchanging unit, the heat exchanging unit located within a mobile computing device;
   transferring heat from within the mobile computing device to the cooling medium at the heat exchanging unit by directing the forced air arriving from the cable at the heat exchanging unit into a manifold located across the length of one end of a heat exchanging element inside the heat exchanging unit, the manifold including a plurality of holes, each of the plurality of holes substantially smaller in diameter than the internal diameter of the manifold and each of the plurality of holes situated in a line on one side of the manifold so that the forced air entering the manifold from the cable will be expelled out of each of the holes across the heat exchanging element; and
   expelling the forced air containing the transferred heat out of the mobile computing device.

2. The method of claim 1, further comprising:
   amplifying the total flow of air across the heat exchanging element by entraining ambient air external to the mobile computing device to flow into the mobile computing device through a first vent in close proximity to the manifold location, the ambient air entrained by the forced air expelled from the holes in the manifold to flow across the heat exchanging element; and
   allowing a combination of the forced air and entrained air to be vented out of the mobile computing device at the opposite end of the heat exchanging element from the manifold.

3. The method of claim 1, further comprising:
   utilizing a plug module interface at the end of the cable coupled to the mobile computing device to allow the mobile computing device to plug and unplug from the cable.

4. A system, comprising:
   a hollow cable to contain a flow of forced air;
   an external cooling station, coupled to a first end of the hollow cable, to maintain a predetermined temperature of the cooling medium; and
      cause the cooling medium to flow through the hollow cable; and
   a mobile computing device including a heat exchanging unit, the heat exchanging unit coupled to a second end of the hollow cable,
   wherein heat generated from a location within the mobile computing device is transferred to the cooling medium at a heat exchanging element in the heat exchanging unit by directing the forced air arriving from the cable into a manifold located across the length of one end of the heat exchanging element, the manifold including a plurality of holes, each of the plurality of holes substantially smaller in diameter than the internal diameter of the manifold and each of the plurality of holes situated in a line on one side of the manifold so that the forced air entering the manifold from the cable will be expelled out of each of the holes across the heat exchanging element and subsequently expelled from the mobile computing device.

5. The system of claim 4, wherein the heat exchanging unit is further operable to:
   amplify the total flow of air across the heat exchanging element by entraining ambient air external to the mobile computing device to flow into the mobile computing device through a first vent in close proximity to the manifold location, the ambient air entrained by the forced air expelled from the holes in the manifold to flow across the heat exchanging element.

6. The system of claim 5, wherein the heat exchanging unit is further operable to:
   allow a combination of the forced air and entrained air to be vented out of the mobile computing device at the opposite end of the heat exchanging element from the manifold.

7. The system of claim 4, further comprising:
   a plug module interface at the end of the cable coupled to the mobile computing device to allow the mobile computing device to dock and undock from the cable.

8. The system of claim 4, wherein the external cooling station includes a power supply to supply power to the mobile computing device.

9. An apparatus, comprising:
   a heat exchanging unit within a mobile computing device to
      receive forced air from a hollow cable originating from an external cooling station;
      route the forced air to a heat exchanging element within the heat exchanging unit;
      facilitate the transfer of heat radiating from the heat exchanging element to the forced air by directing the forced air arriving from the cable into a manifold located across the length of one end of the heat exchanging element inside the heat exchanging unit, the manifold including a plurality of holes, each of the plurality of holes substantially smaller in diameter than the internal diameter of the manifold and each of the plurality of holes situated in a line on one side of the manifold so that the forced air entering the manifold from the cable will be expelled out of each of the holes across the heat exchanging element; and expel the heated forced air out of the mobile computing device.

10. The apparatus of claim 9, wherein the heat exchanging unit is further operable to:

amplify the total flow of air across the heat exchanging element by entraining ambient air external to the mobile computing device to flow into the mobile computing device through a first vent in close proximity to the manifold location, the ambient air entrained by the forced air expelled from the holes in the manifold to flow across the heat exchanging element; and allow a combination of the forced air and entrained air to be vented out of the mobile computing device at the opposite end of the heat exchanging element from the manifold.

11. The apparatus of claim 9, wherein the external cooling station includes a power supply to supply power to the mobile computing device.

* * * * *